United States Patent
Park et al.

(10) Patent No.: US 12,288,093 B2
(45) Date of Patent: Apr. 29, 2025

(54) ELECTRONIC DEVICE FOR HANDLING BOTTLENECK IN SYSTEM AND OPERATING METHOD THEREOF

(71) Applicant: Samsung Electronics Co., Ltd., Suwon-si (KR)

(72) Inventors: Unsang Park, Suwon-si (KR); Kwangtaek Woo, Suwon-si (KR); Woonsang Son, Suwon-si (KR); Sungchun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 18/178,910

(22) Filed: Mar. 6, 2023

(65) Prior Publication Data
US 2023/0281036 A1   Sep. 7, 2023

Related U.S. Application Data

(63) Continuation of application No. PCT/KR2023/001552, filed on Feb. 3, 2023.

(30) Foreign Application Priority Data

Mar. 3, 2022   (KR) .................. 10-2022-0027501
Apr. 8, 2022   (KR) .................. 10-2022-0044056

(51) Int. Cl.
*G06F 9/48*   (2006.01)

(52) U.S. Cl.
CPC .................................. *G06F 9/485* (2013.01)

(58) Field of Classification Search
CPC ... G06F 9/485; G06F 9/30; G06F 9/48; G06F 9/4837; G06F 9/50; G06F 11/30; G06F 9/4887
See application file for complete search history.

(56) References Cited

U.S. PATENT DOCUMENTS 9,323,651 B2   4/2016  Garrett et al.
2012/0324292 A1*  12/2012  Bhat .................. G06F 11/3636
                                                          714/E11.02
(Continued)

FOREIGN PATENT DOCUMENTS

CN    109491858 A    3/2019
JP    2002-287987 A    10/2002
(Continued)

OTHER PUBLICATIONS

International Search Report dated May 1, 2023, issued in International Patent Application No. PCT/KR2023/001552.
(Continued)

*Primary Examiner* — Farley Abad
(74) *Attorney, Agent, or Firm* — Jefferson IP Law, LLP

(57) ABSTRACT

An electronic device for handling a performance bottleneck of a system and an operating method thereof are provided. The electronic device includes a processor and a memory configured to store at least one instruction executable by the processor, wherein the processor, as a response to executing the at least one instruction, may determine, from a point in time corresponding to a start of a predetermined task, whether a threshold time preset for the task arrives, stop determining whether the threshold time has arrived in response to the task terminating prior to the threshold time arriving, and control one or more of resources for performing a task in response to the threshold time arriving prior to the task terminating.

19 Claims, 7 Drawing Sheets

(56) References Cited

U.S. PATENT DOCUMENTS

| | | | | |
|---|---|---|---|---|
| 2013/0346986 | A1* | 12/2013 | Goetz | G06F 11/3055 |
| | | | | 718/102 |
| 2016/0004639 | A1 | 1/2016 | Vorbach | |
| 2016/0095083 | A1* | 3/2016 | Park | H04W 68/00 |
| | | | | 455/458 |
| 2017/0083394 | A1* | 3/2017 | Pont | G06F 11/0721 |
| 2019/0163534 | A1* | 5/2019 | Park | G06F 9/4881 |
| 2020/0264924 | A1* | 8/2020 | Park | G06F 9/4887 |
| 2021/0146948 | A1* | 5/2021 | Lim | G06F 11/0739 |

FOREIGN PATENT DOCUMENTS

| | | |
|---|---|---|
| JP | 2018-195138 A | 12/2018 |
| KR | 10-2000-0040763 A | 7/2000 |
| KR | 10-0391513 B1 | 7/2003 |
| KR | 10-0489947 B1 | 5/2005 |
| KR | 10-2014-0099994 A | 8/2014 |
| KR | 10-2015-0050689 A | 5/2015 |
| KR | 10-2017-0069012 A | 6/2017 |
| KR | 10-2018-0013923 A | 2/2018 |
| KR | 10-2020-0122364 A | 10/2020 |

OTHER PUBLICATIONS

European Search Report dated Jan. 31, 2025, issued in European Application No. 23763637.8.

\* cited by examiner

ELECTRONIC DEVICE FOR HANDLING BOTTLENECK IN SYSTEM AND OPERATING METHOD THEREOF

CROSS-REFERENCE TO RELATED APPLICATION(S)

This application is a continuation application, claiming priority under § 365(c), of an International application No. PCT/KR2023/001552, filed on Feb. 3, 2023, which is based on and claims the benefit of a Korean patent application number 10-2022-0027501, filed on Mar. 3, 2022, in the Korean Intellectual Property Office, and of a Korean patent application number 10-2022-0044056, filed on Apr. 8, 2022, in the Korean Intellectual Property Office, the disclosure of each of which is incorporated by reference herein in its entirety.

BACKGROUND

1. Field

The disclosure relates to an electronic device for handling a bottleneck in a system and an operating method thereof.

2. Description of Related Art

There is an increasing demand for high-performance computing that processes large amounts of high-quality data, and several studies on multiprocessor computer architecture, such as architectures using dual, quad, and octa-core processors, are being conducted. These multiprocessor systems have been developed into systems that may process program code in parallel at the same time. In other words, an environment has been created that allows multiple processors or threads to run concurrently.

The above information is presented as background information only to assist with an understanding of the disclosure. No determination has been made, and no assertion is made, as to whether any of the above might be applicable as prior art with regard to the disclosure.

SUMMARY

In a multiprocessor computing system, a performance bottleneck may be a phenomenon that occurs when several threads in the system compete for limited resources, such as a memory, an input/output (I/O) device, and a network, resulting in a delay in a predetermined thread, which may lead to a decrease in system performance. Particularly, in a case in which a thread in which a delay occurs is a thread related to a user interface (UI), a performance issue that a user using the system may experience may be created. A shortage of resources, a competition for shared resources, a monopoly on resources, misconfiguration of resources, or a faulty operation of resources may be one of the various causes of a system performance bottleneck.

Aspects of the disclosure are to address at least the above-mentioned problems and/or disadvantages and to provide at least the advantages described below. Accordingly, an aspect of the disclosure is to provide a technique for detecting a bottleneck in real time prior to a performance bottleneck phenomenon of a system terminating and dynamically controlling resources in order to effectively remove the bottleneck.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor and a memory configured to store at least one instruction executable by the processor. The at least one processor, as a response to executing the at least one instruction, may be configured to determine, from a point in time corresponding to a start of a predetermined task, whether a threshold time preset for the predetermined task has arrived using a timer. The processor may be configured to stop the determining of whether the threshold time has arrived in response to the predetermined task terminating prior to the threshold time arriving. The processor may be configured to control one or more of resources for performing the task in response to the threshold time arriving prior to the predetermined task terminating.

In accordance with another aspect of the disclosure, an operating method of an electronic device is provided. The operating method includes determining, from a point in time corresponding to a start of a predetermined task, whether a threshold time preset for the predetermined task has arrived using a timer. The operating method may include stopping the determining of whether the threshold time has arrived in response to the predetermined task terminating prior to the threshold time arriving. The operating method may include controlling one or more of resources for performing the predetermined task in response to the threshold time arriving prior to the predetermined task terminating.

According to one embodiment, in a software module different from one or more of threads in which an operation of an electronic device is actually performed, a timer operates when a reference time of a predetermined length expires regardless of whether a task starts or terminates. Accordingly, a bottleneck section may be detected in real time prior to a performance bottleneck terminating, and a necessary resource may be preemptively allocated, minimizing a delay a user may experience and enhancing performance of the electronic device. Therefore, even continuous bottlenecks or an instantaneous bottleneck may be alleviated quickly and effectively.

In addition, according to one embodiment, it may be possible to alleviate a system bottleneck state by monitoring whether there is a delay using a separate timer in real time and identifying the bottleneck state on-device to dynamically allocate a system resource.

Furthermore, even in a system load situation attributable to a combination of various causes, it may be possible to dynamically determine whether a bottleneck is occurring on-device and take immediate action.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
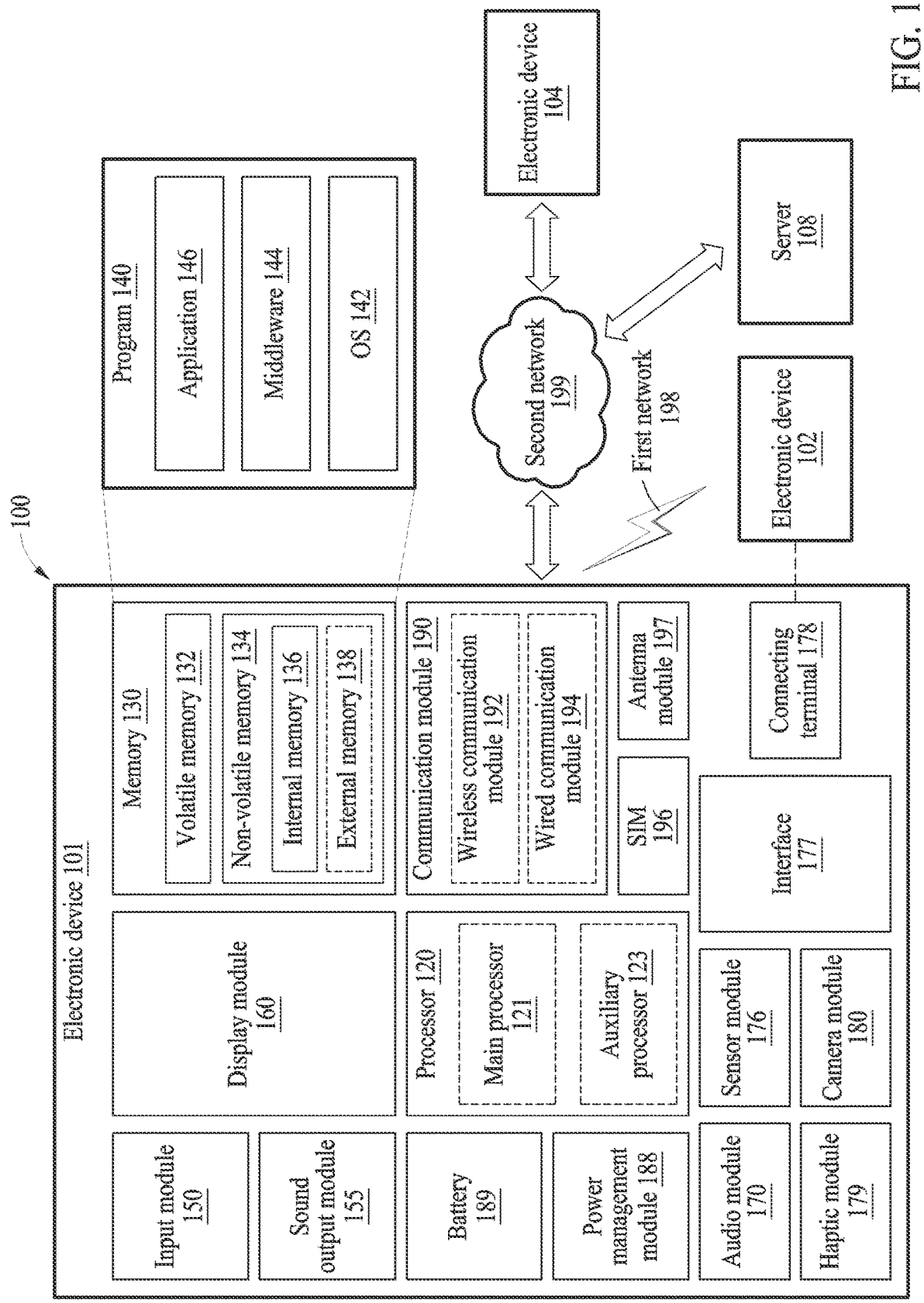
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the displays, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal and vice versa. According to one embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197. According to one embodiment, the antenna module 197 may form a mmWave antenna module. According to one embodiment, the mmWave antenna module may include a PCB, an RFIC disposed on a first surface (e.g., the bottom surface) of the PCB or adjacent to the first surface and capable of supporting a designated high-frequency band (e.g., a mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to one embodiment, all or some of operations to be executed by the electronic device 101 may be executed at one or more external electronic devices (e.g., the external electronic devices 102 and 104, and the server 108). For example, in a case in which the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
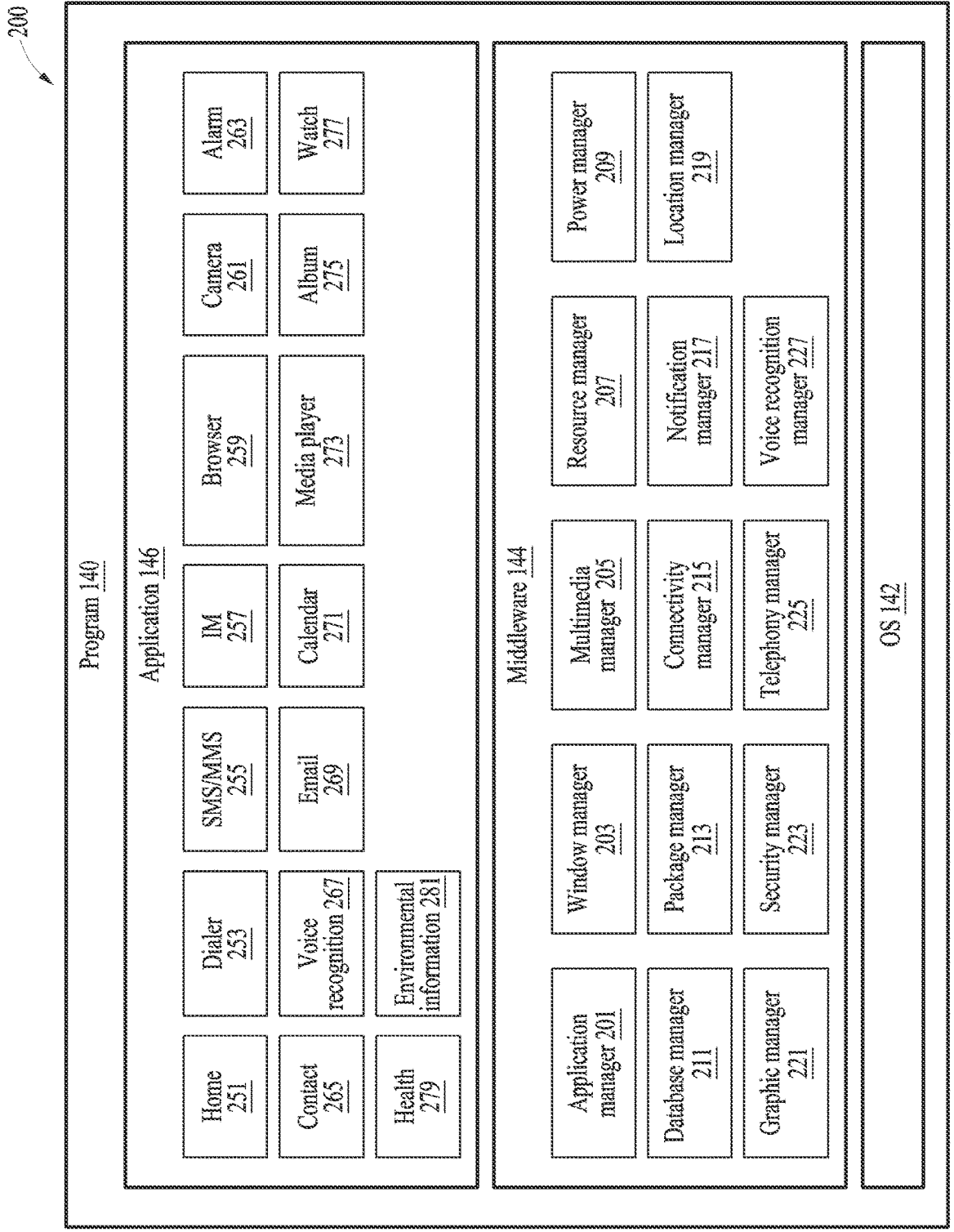
FIG. 2 is a block diagram 200 illustrating a program 140 according to an embodiment of the disclosure.

FIG. 2 is a block diagram illustrating a program according to an embodiment of the disclosure.

Referring to FIG. 2, the program 140 may include an OS 142 to control one or more of resources of the electronic device 101, middleware 144, or an application 146 executable in the OS 142. The OS 142 may include, for example, Android™ iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more of system resources (e.g., a process, a memory, or a power source) of the electronic device 101. The OS 142 may additionally or alternatively include one or more of driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more of resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more of graphical user interface (GUI) resources that are used on a screen. The multimedia manager 205, for example, may identify one or more of formats to be used to play media files, and may encode or decode a corresponding one of the media files using a codec appropriate for a corresponding format selected from one or more of the formats. The resource manager 207, for example, may manage a source code of the application 146 or a memory space of the memory 130. The power manager 209, for example, may manage the capacity, temperature, or power of the battery 189, and may determine or provide related information to be used for the operation of the electronic device 101 based at least in part on corresponding information of the capacity, temperature, or power of the battery 189. According to one embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or an update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alarm). The location manager 219, for example, may manage location information on a location of the electronic device 101. The graphic manager 221, for example, may manage one or more of graphic effects to be offered to a user or a UI related to one or more of graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and may receive, from the server 108, a command corresponding to a function to be executed on the electronic device 101 based at least in part on the voice data, or text data converted based at least in part on the voice data. According to one embodiment, the middleware 144 may dynamically delete some existing components or add new components. According to one embodiment, at least part of the middleware 144 may be included as part of the OS 142 or may be implemented as another piece of software separate from the OS 142.

The application 146 may include, for example, a home application 251, a dialer application 253, a short message service (SMS)/multimedia messaging service (MMS) application 255, an instant message (IM) application 257, a browser application 259, a camera application 261, an alarm application 263, a contact application 265, a voice recognition application 267, an email application 269, a calendar application 271, a media player application 273, an album application 275, a watch application 277, a health application 279 (e.g., for measuring the degree of workout or biometric information, such as blood sugar), or an environmental information application 281 (e.g., for measuring air pressure, humidity, or temperature information). According to one embodiment, the application 146 may further include an information exchange application (not shown) that is capable of supporting information exchange between the electronic device 101 and the external electronic device. The information exchange application may include, for example, a notification relay application adapted to transfer designated information (e.g., a call, message, or alarm) to the external electronic device or a device management application adapted to manage the external electronic device. The notification relay application may transfer, for example, notification information corresponding to an occurrence of a specified event (e.g., receipt of an email) at another application (e.g., the email application 269) of the electronic device 101 to the external electronic device. Additionally, or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module of the external electronic device). The device management application may additionally or alternatively support the installation, deletion, or update of an application being operated on the external electronic device.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that in a case in which an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to one embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. In a case in which the computer program product is distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components prior to the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
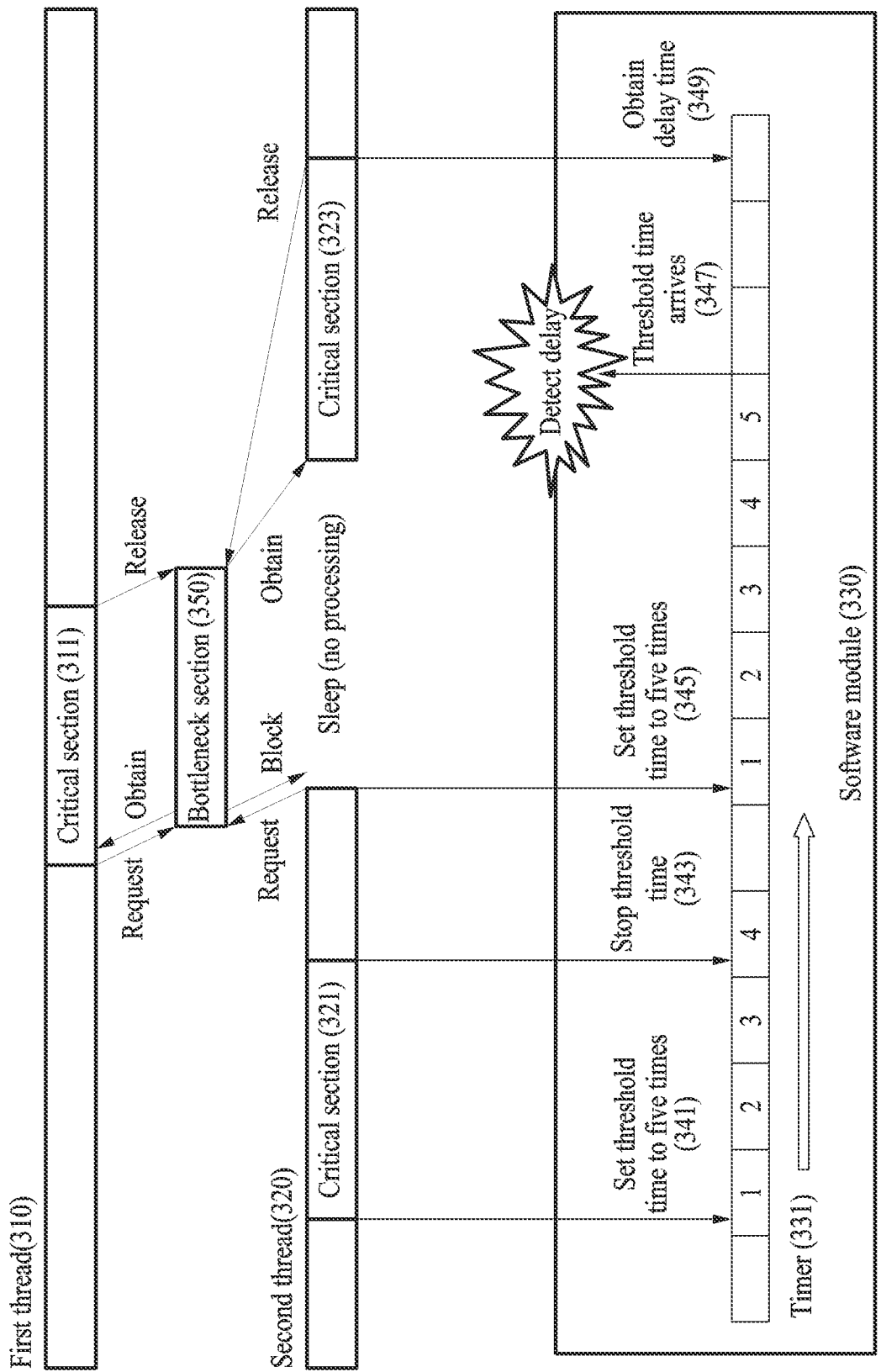
FIG. 3 is a diagram illustrating an operation of determining whether there is a delay according to an embodiment of the disclosure.

FIG. 3 is a diagram illustrating an operation of determining whether there is a delay according to an embodiment of the disclosure.

FIG. 3 illustrates an example of a plurality of threads (e.g., a first thread 310 and a second thread 320) and a software module 330 executed in a processor (e.g., the processor 120 of FIG. 1) in an electronic device (e.g., the electronic device 101 of FIG. 1) according to one embodiment. The electronic device may include various computing devices such as a mobile phone, a smartphone, a tablet, a laptop, a personal computer (PC), or an e-book device, various wearable devices such as a smart watch, smart eyeglasses, a head mounted display (HMD), or smart clothes, various home appliances such as a smart speaker, a smart television (TV), or a smart refrigerator, and other devices such as a smart vehicle, a smart kiosk, an Internet of things (IoT) device, a walking assist device (WAD), a drone, a robot, and the like.

A delay may occur in the electronic device for various reasons. Identifying whether such a delay occurs in real time and preemptively allocating necessary resources may alleviate a performance bottleneck. Referring to FIG. 3, an operation of determining whether there is a delay in real time is described in detail, assuming that a delay occurs when the plurality of threads (e.g., the first thread 310 and the second thread 320) use a same lock.

In the example of FIG. 3, a critical section included in each of the plurality of threads (e.g., the first thread 310 and the second thread 320) may correspond to a task in which a delay that may be experienced by a user using a corresponding electronic device may occur among tasks performed in each thread.

For example, a critical section may include at least one of a task in which a same lock as a lock of another thread is used, a task in which a variable shared with another thread is used, a task in which a memory is shared with another thread, a task in which an input/output (I/O) is shared, a task that is responsible for displaying an output on a screen of the electronic device, or a task according to a request input by the user. The task in which the same lock as the lock of another thread is used may be set as a critical section because one thread may be denied access to required data, may no longer perform the task and may stop its operation until the lock is released in a case in which the other thread uses the lock first. Similarly, the task in which a variable shared with another thread is used may be set as a critical section because one thread may be denied access to the variable, may no longer perform the task, and may stop its operation until access by the other thread to the variable is terminated in a case in which the other thread has access to the variable first and reads or modifies the variable. In addition, the task in which a memory or an I/O is shared with another thread may be set as a critical section because one thread may take more time to complete its operation due to a decrease in a size of the memory or I/O available to the one thread in a case in which the other thread uses the memory or I/O to a great extent. In addition, the task that is responsible for displaying an output on a screen of the electronic device may be set as a critical section because the user may react more sensitively to a delay that occurs while a task of updating the screen is being performed, since the task is supposed to be performed at a regular time interval. In addition, the task according to a request input by the user may be set as a critical section because the user may have more sensitivity to a delay in receiving a result that is supposed to be provided to the user after an operation according to the request from the user is performed. Examples of these tasks may include a task according to a touch gesture input by the user, a message queue processing task performed by a looper operating in a system server, and a lock task operating in the system server, but examples are not limited thereto. For such a critical section, it may be possible to effectively suppress an unnecessary delay by determining whether there is a delay based on a timer 331 to be described later and performing a resource control according to a determination result.

In the second thread 320, in response to a critical section 321 occurring, a start event of a corresponding task may be transmitted to the software module 330, and the software module 330 may determine 341 whether a threshold time, preset for the task, arrives from a point in time corresponding to a start of the task using the timer 331. The point in time corresponding to the start of the task may be, for example, one of a point in time at which the start event is received by the software module 330 and a point in time at which the task actually starts, but examples are not limited thereto. Since an execution time of each task without any delay may vary, the threshold time may also be set differently according to a task.

The software module 330 may include the timer 331 for determining whether there is a delay. The timer 331 may operate when a reference time of a predetermined length has repeatedly expired. For example, when a reference time set for the timer 331 is 100 milliseconds (ms) and a threshold time is 500 ms, a determination of whether the threshold time has arrived may be based on whether the reference time has expired five times. The timer 331 may operate when the reference time of the predetermined length has repeatedly expired regardless of whether tasks executed in the plurality of threads (e.g., the first thread 310 and the second thread 320) have started or terminated. As described above, measuring a time using the timer 331 whose reference time has repeatedly expired based on how many times the reference time has expired may remove the need to use an operation which involves creating and deleting a new timer whenever a task corresponding to a critical section is executed and terminated and causes system load, and accordingly, the time may be effectively measured.

For example, a threshold time preset for the task may be 500 ms, and the software module 330 may determine whether the reference time has expired five times in the timer 331.

If the critical section 321 terminates in the second thread 320 prior to the threshold time arriving, a termination event 343 of the task may be transmitted to the software module 330, and the software module 330 may stop determining whether the threshold time has arrived. In this example, it may be determined that the task is performed normally without any delay, and no separate resource control is performed.

It is assumed that there is a critical section 311 of a first thread 310 and there is a critical section 323 of a second thread 320 that use the same lock. When the critical section 311 of the first thread 310 starts prior to the critical section 323 of the second thread 320 and uses the lock first, the critical section 323 may be denied access to required data by the lock and may need to wait until the lock is released, while being unable to perform any operation. This waiting section may be referred to as a bottleneck section 350. Even when the critical section 323 of the second thread 320 is no longer performing its operation and is in a waiting state, a corresponding start event 345 may be transmitted to the software module 330, and the software module 330 may determine whether a threshold time preset for a corresponding task has arrived from a point in time corresponding to a start of the task using the timer 331, since the critical section 323 has already started. For example, a threshold time preset for the task may be 500 ms, and the software module 330 may determine whether the reference time has expired five times in the timer 331.

The threshold time may arrive 347 prior to the critical section 323 being terminated by the bottleneck section 350. In response to the threshold time arriving, the software module 330 may detect that there is a delay. In response to the delay being detected, one or more of resources may be controlled for performing an operation of the critical section 323. One or more of the resources that may accelerate the operation of the critical section 323 may be allocated to the critical section 323.

Control of one or more of the resources may include at least one of control of an operation clock of components included in the electronic device, control of an available memory, or control of a background (BG) processor. The control of the operation clock of the components may be control of an operation clock of a processor (e.g., a CPU and a GPU) and a bus included in the electronic device, may include, for example, a boost and restriction lifting through HyperHAL, and may speed up an operation by increasing an operation clock. In addition, the control of the available memory may allocate more memory to a corresponding task to induce operation acceleration. For example, inducing a memory reclaim operation or a low memory killer daemon (LMKD) technique that automatically kills a task may preemptively secure the available memory when memory runs out. Furthermore, the control of the BG processor may be a technique of controlling a hidden computer process running in the background without a user's intervention. For example, a foreground task may be accelerated by limiting the processor running in the background. In other words, the control of the BG processor may be a technique of reducing a resource race condition as much as possible by stopping any background process other than an entering application (i.e., a top application) to improve an execution speed of a currently running application. Using this technique may make it possible to detect a bottleneck, detect entry of an application, determine that an application with current user interaction is the top application, and reduce the background process resource race condition as much as possible, thereby ensuring the application operates properly to the extent possible.

When a termination event 349 in which the critical section 323 terminates is transmitted to the software module 330, the software module 330 collects information on a delay time of a delay that has occurred. Such delay information may be used to prepare for a delay that may occur later, but examples are not limited thereto.

In the software module 330 different from the plurality of threads (e.g., the first thread 310 and the second thread 320) in which an operation of an electronic device is actually performed, the timer 331 operates when the reference time of the predetermined length expires regardless of whether a task starts or terminates. Accordingly, the bottleneck section 350 may be detected in real time prior to a performance bottleneck terminating, and a necessary resource may be preemptively allocated, minimizing a delay the user may experience and enhancing performance of the electronic device. Therefore, even continuous bottlenecks or an instantaneous bottleneck may be alleviated quickly and effectively.

Although the example of FIG. 3 is described based on a case in which an operation of determining whether there is a delay is performed on the second thread 320, but embodiments are not limited thereto, and the description provided herein may also apply to the first thread 310 or another thread not shown in FIG. 3.

Figure 4:
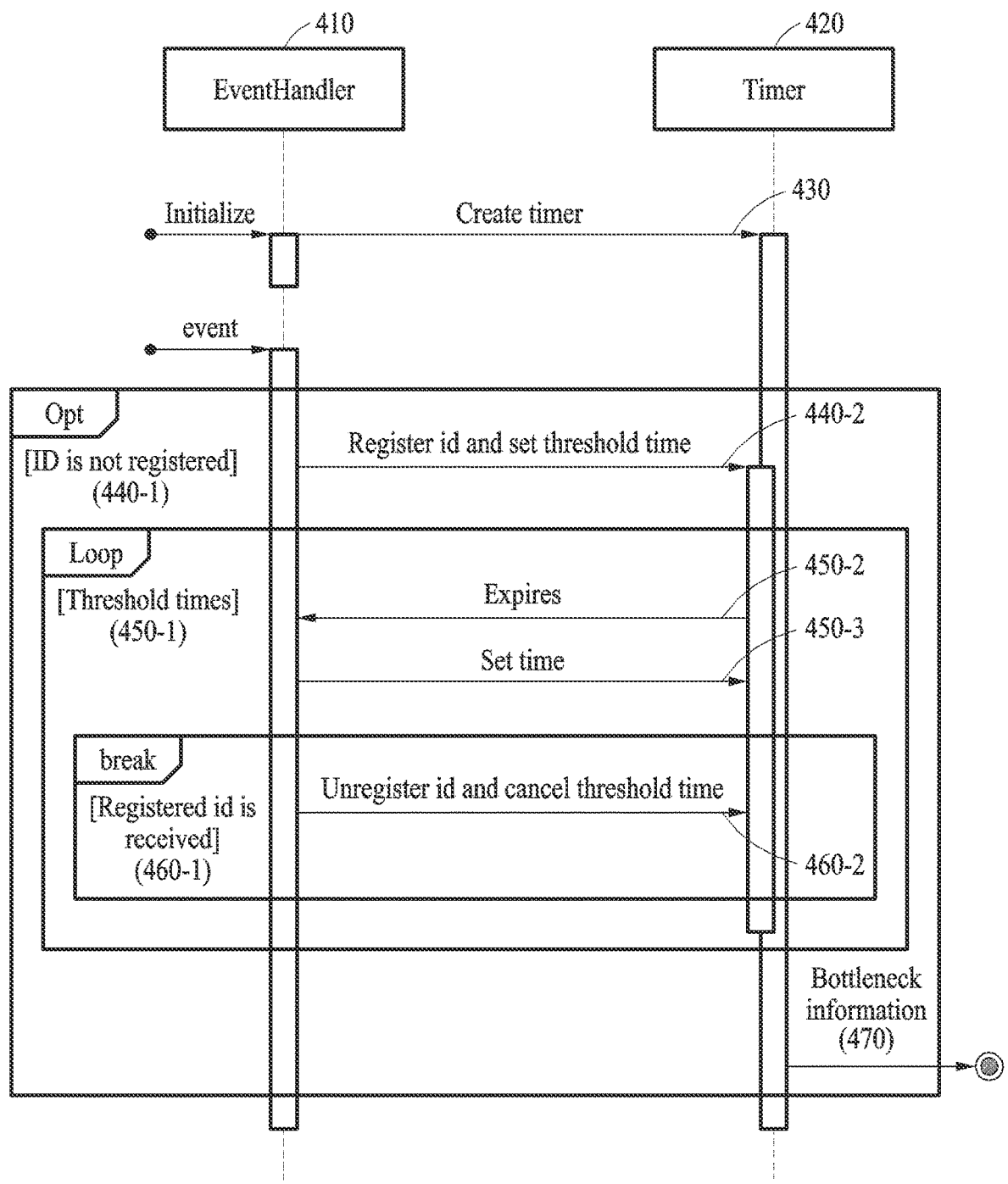
FIG. 4 is a sequence diagram illustrating an operation of determining whether there is a delay according to an embodiment of the disclosure.

FIG. 4 is a sequence diagram illustrating an operation of determining whether there is a delay according to an embodiment of the disclosure.

FIG. 4 is a sequence diagram illustrating an example of an operation of a software module (e.g., the software module 330 of FIG. 3) according to an occurrence of a start event and a termination event of a critical section (e.g., the critical sections 321 and 323 of FIG. 3) in a thread (e.g., the second thread 320 of FIG. 3) on which an operation of determining whether there is a delay is performed.

Referring to FIG. 4, an operation of initializing performed when the software module is generated may generate an EventHandler 410, and operation 430 of creating a timer may create a timer 420 (e.g., the timer 331 of FIG. 3). The created timer 420 may operate when a reference time of a predetermined length has repeatedly expired regardless of whether a critical section starts or terminates.

When a start event of the critical section occurs, the EventHandler 410 may determine whether an identification (ID) for the critical section is registered. A determination of whether the ID is registered may be used to check a case in which a determination of whether the threshold time corresponding to a current corresponding critical section has arrived is being performed. In a case in which the determination of whether the threshold time has arrived, but has not yet been performed by the start event of the corresponding critical section, it may be determined that the ID is not registered 440-1. In this example, a request to register the ID and set the threshold time 440-2 may be transmitted to the timer 420. The timer 420 may start determining whether a threshold time preset for the corresponding critical section that has arrived based on the request.

The EventHandler 410 may repeatedly expire 450-2 and set 450-3 a reference time during a threshold time 450-1 until a next event (e.g., a termination event) of the critical section is received.

If the termination event of the critical section is received prior to the threshold time arriving and the ID of the critical section being registered 460-1, it may mean that the timer 420 is currently determining whether the threshold time has arrived. The EventHandler 410 may transmit a request to unregister the ID and cancel the threshold time 460-2 to the timer 420. The timer 420 may stop determining whether the threshold time has arrived according to the request.

Conversely, in a case in which the termination event of the critical section has not been received prior to the threshold time arriving, it may be determined that a delay caused by a bottleneck is occurring, and bottleneck information 470 is transmitted to a resource control module such that a bottleneck delay in a critical path may be effectively reduced.

Figure 5:
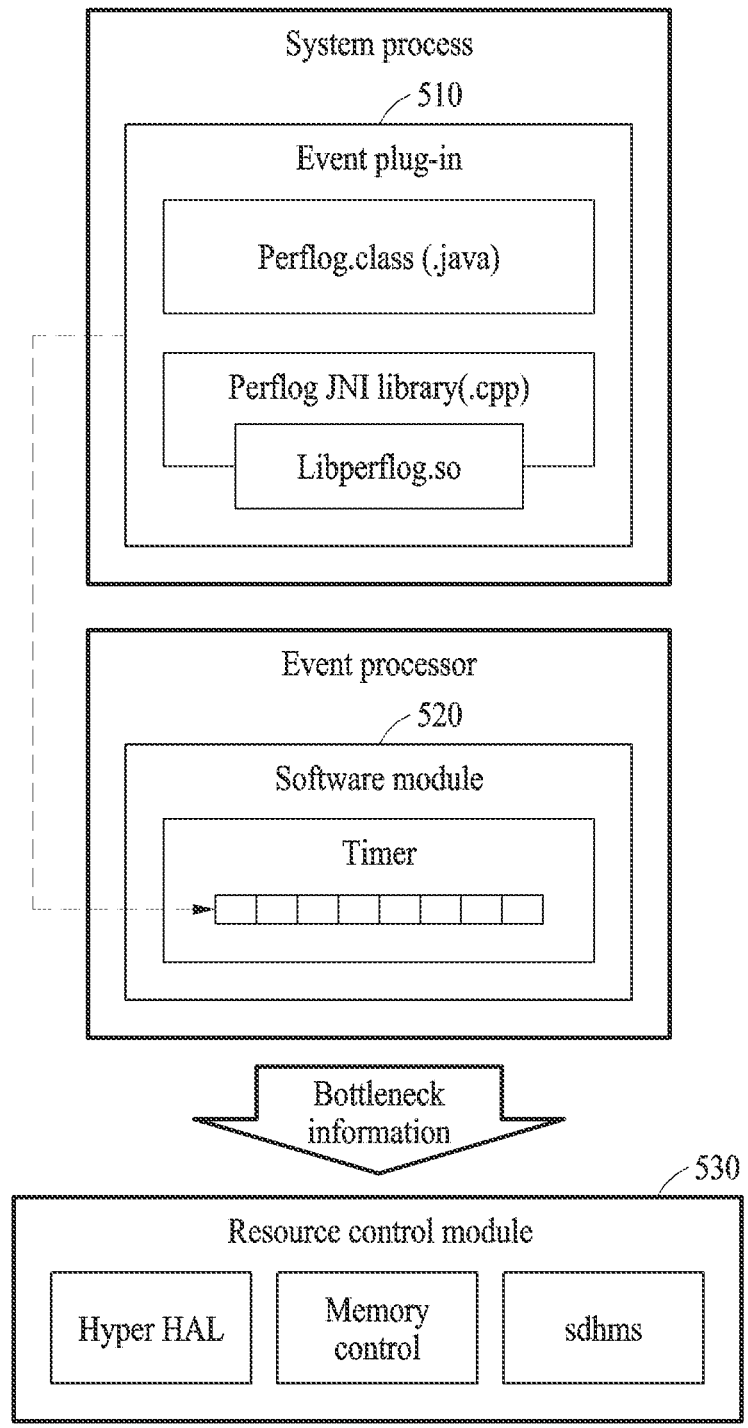
FIG. 5 is a diagram illustrating an operation of transmitting an event to a software module according to an embodiment of the disclosure.

FIG. 5 is a diagram illustrating an operation of transmitting an event to a software module according to an embodiment of the disclosure.

FIG. 5 illustrates an example in which an event is transmitted to a software module 520 (e.g., the software module 330 of FIG. 3) from an event plug-in 510.

Referring to FIG. 5, the event plug-in 510 may be provided in a form of a class and a Java Native Interface (JNI) library to a system process and may generate a system process situation as an event and transmit the event to the software module 520. In response to receiving the event from the event plug-in 510, the software module 520 in an event processor may determine whether a threshold time corresponding to the event has arrived. In a case in which the software module 520 has not received a termination event by the time the threshold time arrives after a predetermined number of reference times have expired, the software module 520 may determine that there is a delay caused by a bottleneck. In response to a determination that there is the delay, the software module 520 may transmit bottleneck information (e.g., the bottleneck information 470 of FIG. 4) to a resource control module 530 to use a necessary system resource and may effectively reduce a bottleneck delay in a critical path.

As described above, monitoring whether there is a delay in real time using a separate timer (e.g., the timer 331 of FIG. 3 and the timer 420 of FIG. 4) may allow quick identification of a bottleneck state on-device and dynamic allocation of a system resource, thereby alleviate a system bottleneck state. In addition, even in a system load situation attributable to a combination of various causes, it may be possible to dynamically determine whether a bottleneck is occurring on-device and take immediate action. Furthermore, it may be possible to dynamically identify in real time when a device is in a busy state and provide a necessary resource at a right time, in a right place. Accordingly, limited resources may be efficiently used, and performance may be effectively enhanced.

Figure 6:
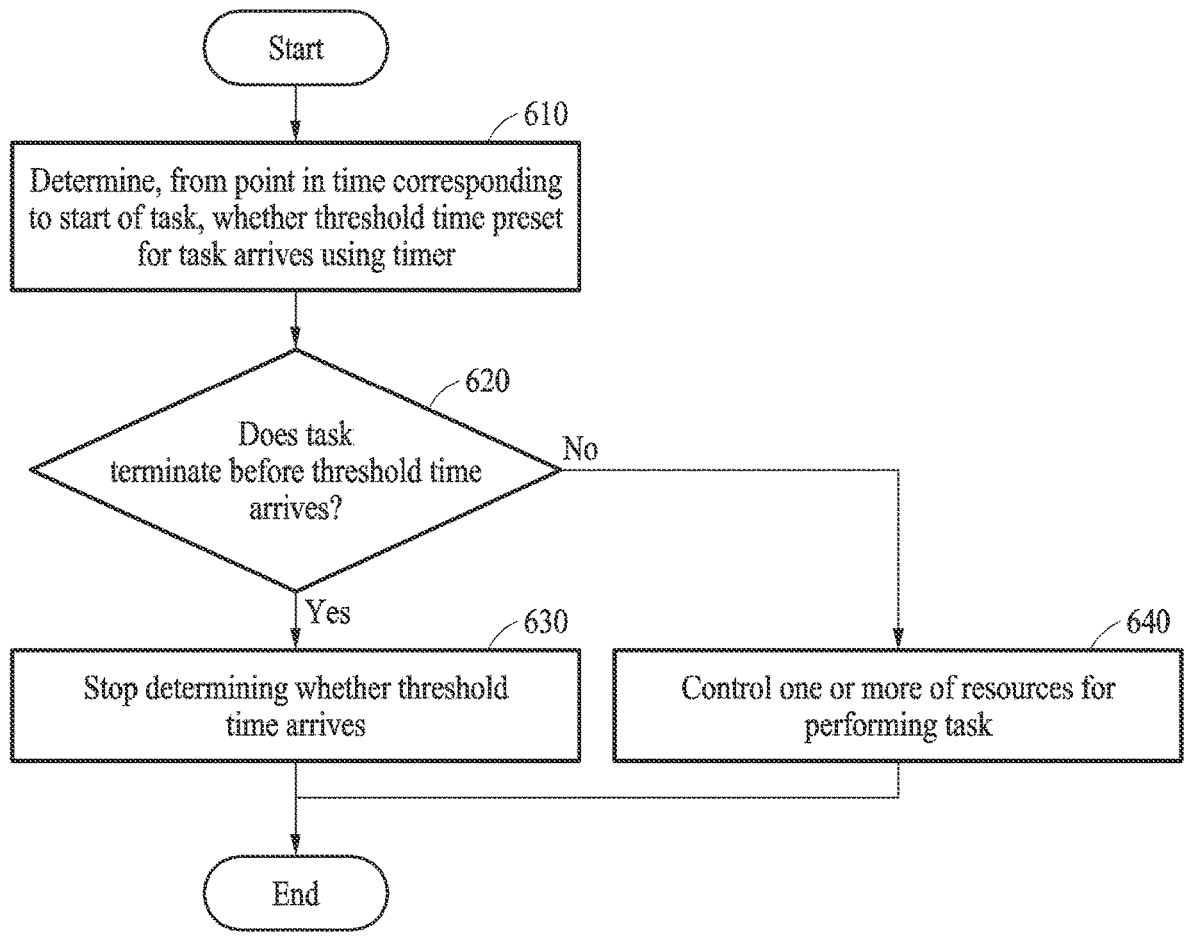
FIG. 6 is a diagram illustrating an operating method of an electronic device according to an embodiment of the disclosure.

FIG. 6 is a diagram illustrating an operating method of an electronic device according to an embodiment of the disclosure.

Operations to be described hereinafter referring to FIG. 6 may be performed in sequential order, but are not necessarily performed in sequential order. For example, the order of the operations may be changed, and at least two of the operations may be performed in parallel. Operations 610 through 640 may be performed by at least one component (e.g., the processor 120 of FIG. 1) of an electronic device (e.g., the electronic device 101 of FIG. 1).

Referring to FIG. 6, in operation 610, the electronic device may determine, from a point in time corresponding to a start of a predetermined task, whether a threshold time preset for the task has arrived using a timer (e.g., the timer 331 of FIG. 3 and the timer 420 of FIG. 4).

In operation 620, the electronic device may determine whether the task terminates prior to the threshold time arriving. In response to the task terminating prior to the threshold time arriving and this being determined, operation 630 may be performed subsequently. Conversely, in response to the threshold time arriving prior to the task terminating and this being determined, operation 640 may be performed subsequently.

In operation 630, the electronic device may stop determining whether the threshold time has arrived. The electronic device may determine that there is no delay and stop an operation of determining whether the threshold time has arrived.

In operation 640, the electronic device may control one or more of resources for performing the task. The electronic device may determine that there is a delay and control one or more of the resources to resolve a bottleneck.

According to one embodiment, an operating method of an electronic device may include determining, from a point in time corresponding to a start of a predetermined task, whether a threshold time preset for the task has arrived using a timer, stopping determining whether the threshold time has arrived in response to the task terminating prior to the threshold arriving, and controlling one or more of the resources for performing the task in response to the threshold time arriving prior to the task terminating.

According to one embodiment, in the operating method of the electronic device, the timer may operate when a reference time of a predetermined length has repeatedly expired regardless of whether the task starts or terminates.

According to one embodiment, in the operating method of the electronic device, a determination of whether the threshold time has arrived may be based on how many times the reference time expires from the point in time corresponding to the start of the task.

According to one embodiment, in the operating method of the electronic device, the timer may operate in a software module (e.g., the software module 330 of FIG. 3 and the software module 520 of FIG. 5) different from a thread in which the task is performed, and the determining of whether the threshold time preset for the predetermined task has arrived may include starting the determining of whether the threshold time has arrived using the timer in response to a start event corresponding to the start of the task being transmitted to the software module.

According to one embodiment, in the operating method of the electronic device, the stopping of determining whether the threshold time has arrived may include stopping the determining of whether the threshold time has arrived using the timer in response to a corresponding termination event being transmitted to the software module from the thread when the task terminates.

According to one embodiment, in the operating method of the electronic device, the predetermined task may be a task in which an occurrence of a delay to be experienced by a user using the electronic device may be possible.

According to one embodiment, in the operating method of the electronic device, the predetermined task may include at least one of a task in which a same lock as a lock of another thread is used, a task in which a variable shared with another thread is used, a task in which an I/O is shared with another thread, a task in which a memory is shared with another thread, a task that is responsible for displaying an output on a screen of the electronic device, or a task performed according to a request input by the user.

According to one embodiment, in the operating method of the electronic device, the threshold time may be determined based on a task to be started.

According to one embodiment, in the operating method of the electronic device, the controlling of one or more of the resources may include at least one of controlling an operation clock of components included in the electronic device related to the task, controlling an available memory, or controlling a BG processor in response to the threshold time arriving prior to the task terminating.

Figure 7:
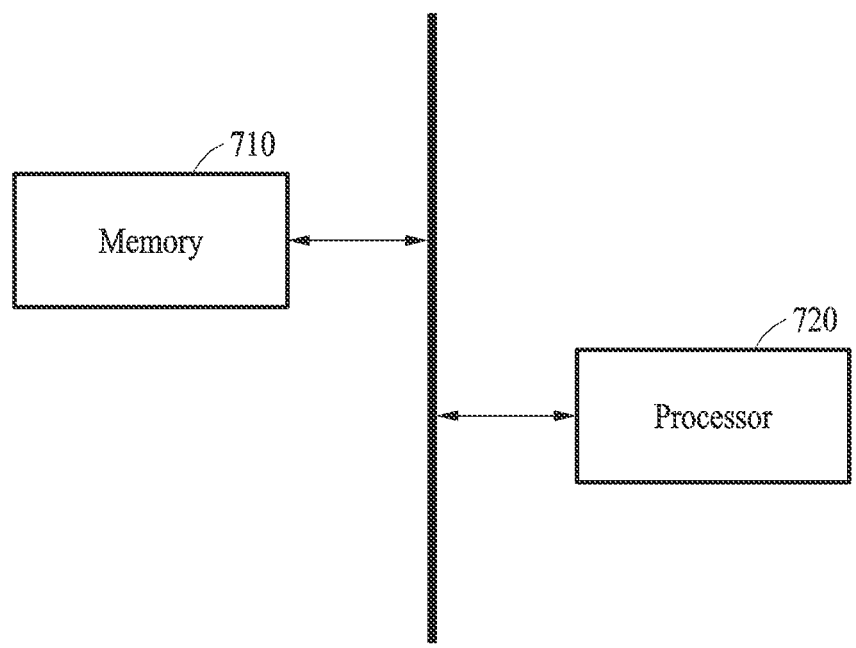
FIG. 7 is a diagram illustrating an electronic device according to an embodiment of the disclosure.

FIG. 7 is a diagram illustrating an electronic device according to an embodiment of the disclosure.

Referring to FIG. 7, an electronic device 700 (e.g., the electronic device 101 of FIG. 1) according to one embodiment may include a memory 710 (e.g., the memory 130 of FIG. 1) and a processor 720 (e.g., the processor 120 of FIG. 1).

The electronic device 700 according to one embodiment may be implemented as a user terminal. The user terminal may include, for example, various computing devices such as a mobile phone, a smartphone, a tablet computer, a laptop, a PC, or an e-book device, various wearable devices, such as a smart watch, smart eyeglasses, an HMD, or smart clothes, various home appliances such as a smart speaker, a smart TV, or a smart refrigerator, and other devices such as a smart vehicle, a smart kiosk, an IoT device, a WAD, a drone, or a robot.

The memory 710 may include computer-readable instructions. The processor 720 may perform the operations described above when the instructions stored in the memory 710 are executed by the processor 720. The memory 710 may be a volatile memory or a non-volatile memory. The processor 720 may be a device that executes instructions or programs or that controls the electronic device 700.

The processor 720 may determine, from a point in time corresponding to a start of a predetermined task, whether a threshold time, preset for the task, has arrived using a timer, stop the determining of whether the threshold time has arrived in response to the task terminating prior to the threshold time arriving, and control one or more of resources for performing the task in response to the threshold time arriving prior to the task terminating.

In addition, the electronic device 700 may process the operations described above.

According to one embodiment, the electronic device 700 may include the processor 720 and the memory 710 configured to store at least one instruction executable by the processor 720. The processor 720, as a response to executing the at least one instruction, may be configured to determine, from a point in time corresponding to a start of a predetermined task, whether a threshold time preset for the predetermined task has arrived using a timer, stop determining whether the threshold time has arrived in response to the predetermined task terminating prior to the threshold time arriving, and control one or more of resources for performing the predetermined task in response to the threshold time arriving prior to the predetermined task terminating.

According to one embodiment, in the electronic device 700, the timer may operate when a reference time of a predetermined length has repeatedly expired regardless of whether the predetermined task starts or terminates.

According to one embodiment, in the electronic device 700, a determination of whether the threshold time has arrived may be based on how many times the reference time has expired from the point in time corresponding to the start of the predetermined task.

According to one embodiment, in the electronic device 700, the timer may operate in a software module (e.g., the software module 330 of FIG. 3 and the software module 520 of FIG. 5) different from a thread in which the predetermined task is performed, a start event corresponding to the start of the predetermined task may be transmitted to the software module from the thread, and the software module may start determining whether the threshold time has arrived using the timer in response to receiving the start event.

According to one embodiment, when the predetermined task terminates in the electronic device 700, a corresponding termination event may be transmitted to the software module from the thread, and the software module may stop determining whether the threshold time has arrived using the timer in response to receiving the termination event.

According to one embodiment, in the electronic device 700, the predetermined task may be a task in which an occurrence of a delay to be experienced by a user using the electronic device may be possible.

According to one embodiment, in the electronic device 700, the predetermined task may include at least one of a task in which a same lock as a lock of another lock is used, a task in which a variable shared with another thread is used, a task in which an I/O is shared with another thread, a task in which the memory 710 is shared with another thread, a task that is responsible for displaying an output on a screen of the electronic device 700, or a task performed according to a request input by the user.

According to one embodiment, in the electronic device 700, the threshold time may be determined based on a task to be started.

According to one embodiment, in the electronic device 700, the processor 720 may control at least one of an operation clock of components included in the electronic device related to the predetermined task, an available memory related to the predetermined task, or a BG processor in response to the threshold time arriving prior to the predetermined task terminating.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
memory storing one or more computer programs; and
one or more processors communicatively coupled to the memory,
wherein the one or more computer programs include computer-executable instructions that, when executed by the one or more processors individually or collectively, cause the electronic device to:

determine, from a point in time corresponding to a start of a critical section of a predetermined task, whether a threshold time preset for the predetermined task has arrived using a timer, and control one or more of resources for performing the predetermined task in response to the threshold time arriving prior to the predetermined task terminating, and wherein the timer operates when a reference time of a predetermined length has repeatedly expired regardless of whether the predetermined task starts or terminates.

2. The electronic device of claim 1, wherein the determination of whether the threshold time has arrived is based on how many times the reference time has expired from the point in time corresponding to the start of the predetermined task.

3. The electronic device of claim 1, wherein the timer operates in a software module different from a thread in which the predetermined task is performed, wherein a start event corresponding to the start of the predetermined task is transmitted from the thread to the software module, and wherein the software module starts determining whether the threshold time has arrived using the timer in response to receiving the start event.

4. The electronic device of claim 3, wherein, when the predetermined task terminates prior to the threshold time arriving, a corresponding termination event is transmitted from the thread to the software module, and wherein the software module stops determining whether the threshold time has arrived using the timer in response to receiving the termination event.

5. The electronic device of claim 1, wherein the predetermined task is a task in which an occurrence of a delay to be experienced by a user using the electronic device is possible.

6. The electronic device of claim 1, wherein the predetermined task comprises at least one of:

a task in which a same lock as a lock of another thread is used;

a task in which a variable is shared with another thread;

a task in which an input/output (I/O) is shared with another thread;

a task in which a memory is shared with another thread;

a task that is responsible for displaying an output on a screen of the electronic device; or a task performed according to a request input by a user.

7. The electronic device of claim 1, wherein the threshold time is determined based on a task to be started.

8. The electronic device of claim 1, wherein the one or more computer programs further include computer-executable instructions that, when executed by the one or more processors individually or collectively, cause the electronic device to, in response to the threshold time arriving prior to the predetermined task terminating, control at least one of:

an operation clock of components comprised in the electronic device related to the predetermined task;

an available memory related to the predetermined task; or a background (BG) processor.

9. The electronic device of claim 1, wherein the one or more computer programs further include computer-executable instructions that, when executed by the one or more processors individually or collectively, cause the electronic device to control one or more of the resources to cause the predetermined task to terminate and obtain a delay time for the predetermined task.

10. The electronic device of claim 1, wherein the one or more computer programs further include computer-executable instructions that, when executed by the one or more processors individually or collectively, cause the electronic device to stop the determining of whether the threshold time has arrived in response to the predetermined task terminating prior to the threshold time arriving.

11. An operating method of an electronic device, the operating method comprising:

determining, from a point in time corresponding to a start of a critical section of a predetermined task, whether a threshold time preset for the predetermined task has arrived using a timer;

and controlling one or more of resources for performing the predetermined task in response to the threshold time arriving prior to the predetermined task terminating, wherein the timer operates when a reference time of a predetermined length has repeatedly expired regardless of whether the predetermined task starts or terminates.

12. The operating method of claim 11, wherein the determination of whether the threshold time has arrived is based on how many times the reference time has expired from the point in time corresponding to the start of the predetermined task.

13. The operating method of claim 11, wherein the timer operates in a software module different from a thread in which the predetermined task is performed, and wherein the determining of whether the threshold time preset for the predetermined task has arrived comprises, in response to a start event corresponding to the start of the predetermined task being transmitted from the thread to the software module, starting the determining of whether the threshold time has arrived using the timer.

14. The operating method of claim 13, further comprising:

in response to a termination event corresponding to a termination of the predetermined task prior to the threshold time arriving being transmitted from the thread to the software module, stopping the determining of whether the threshold time has arrived using the timer.

15. The operating method of claim 13, wherein the point in time corresponding to the start of the predetermined task is one of a point in time at which the start event is received by the software module or a point in time at which the predetermined task actually starts.

16. The operating method of claim 11, wherein the controlling of the one or more of the resources comprises, in response to the threshold time arriving prior to the predetermined task terminating, controlling at least one of:

an operation clock of components comprised in the electronic device related to the predetermined task;

an available memory related to the predetermined task; or a background (BG) processor.

17. The operating method of claim 16, wherein the operation clock of the components controls at least one of an operation clock of a processor or a bus included in the electronic device.

18. The operating method of claim 11, wherein the threshold time is set differently according to each different task.

19. A non-transitory computer-readable storage medium storing instructions that, when executed by a processor, cause the processor to perform an operating method of an electronic device, the operating method comprising:
- determining, from a point in time corresponding to a start of a critical section of a predetermined task, whether a threshold time preset for the predetermined task has arrived using a timer; and
- controlling one or more of resources for performing the predetermined task in response to the threshold time arriving prior to the predetermined task terminating,
- wherein the timer operates when a reference time of a predetermined length has repeatedly expired regardless of whether the predetermined task starts or terminates.

* * * * *